United States Patent [19]

Higgins et al.

[11] Patent Number: 5,218,668
[45] Date of Patent: Jun. 8, 1993

[54] KEYWORD RECOGNITION SYSTEM AND METHOD USING TEMPLATE CONCANTENATION MODEL

[75] Inventors: Alan L. Higgins, Del Mar; Robert E. Wohlford; Lawrence G. Bahler, both of San Diego, all of Calif.

[73] Assignee: ITT Corporation, New York, N.Y.

[21] Appl. No.: 961,014

[22] Filed: Oct. 14, 1992
(Under 37 CFR 1.47)

Related U.S. Application Data

[63] Continuation of Ser. No. 455,899, Dec. 21, 1989, abandoned, which is a continuation-in-part of Ser. No. 655,958, Sep. 28, 1984, abandoned.

[51] Int. Cl.⁵ ............................................. G10L 5/00
[52] U.S. Cl. ....................................................... 395/2
[58] Field of Search ......................... 395/2; 381/39–47

[56] References Cited

U.S. PATENT DOCUMENTS

| | | | |
|---|---|---|---|
| 4,081,607 | 3/1978 | Vitals et al. | 381/45 |
| 4,331,837 | 5/1982 | Soumagne | 381/46 |
| 4,481,593 | 11/1984 | Bahler | 381/43 |
| 4,489,434 | 12/1984 | Moshier | 381/43 |
| 4,489,435 | 12/1984 | Moshier | 381/43 |
| 4,567,606 | 1/1986 | Vensko et al. | 381/43 |
| 4,587,670 | 5/1986 | Levinson et al. | 395/2 |
| 4,624,008 | 11/1986 | Vensko et al. | 381/43 |
| 4,625,327 | 11/1986 | Sluijter et al. | 381/49 |

OTHER PUBLICATIONS

Jelinek, "Continuous Speech Recognition by Statistical Methods", Proc. at the IEEE, vol. 64, No. 4, Apr. 1976, pp. 532–556.
Levinson et al., "Interactive Clustering Techniques for Selecting Speaker-Independent Reference Templates for Isolated Word Recognition".

*Primary Examiner*—David D. Knepper
*Attorney, Agent, or Firm*—Arthur L. Plevy; Patrick M. Hogan

[57] ABSTRACT

Similarity is measured between incoming speech and a plurality of candidate strings of filler and keyword templates to test the hypothesis of a keyword being present against the hypothesis of a keyword not being present in the input speech. As alternatives to a candidate string containing a keyword template, other candidate strings are assembled with filler templates of short speech sounds that may be similar to a keyword. A keyword is "recognized" only when an optimal candidate string containing the corresponding keyword template is determined to match the input speech more closely than all other candidate strings. A concatenation penalty is added to the partial string score each time a new template is added to a candidate string, in order to bias the score in favor of a candidate string containing a longer, keyword template.

20 Claims, 9 Drawing Sheets

```
           DPA OPERATION FOR CSR SYSTEM
  FOR EACH INPUT FRAME {
      RESCALE SCORES IF NEEDED
       ACTIVATE NODES WITH BOTTOM SCORES
      FOR EACH ACTIVE NODE {
          FOR EACH TEMPLATE IN NODE          SCORE
              DO INNER LOOP                  COMPUTATION
          DO NODE PRUNING
          UPDATE GLOBAL MINIMUM
           GET TOP SCORES AND BEST PHRASE OPTION}

SORT TOP SCORES, SAVE OPTIONS IN PHRASE BUFFER    SYNTAX
      CHECK FOR OUTPUT CRITERION                        PROCESSING
      COMPUTE NEXT FRAME'S BOTTOM SCORES }
```

| | | | |
|---|---|---|---|
| TOPSCORES  N | $s_{i-1,N}$ | | |
| N-1 | $s_{i-1,N-1}$ | | |
| ⋮ | | | |
| TEMPLATE FRAMES  j | H → ↗ ↑ | | |
| j-1 | D ↗ ↓ | | |
| j-2 | ○ ↗ | | |
| ⋮ | | | |
| 2 | $s_{i-1,2}$ | | |
| 1 | $s_{i-1,1}$ | | |
| BOTTOM SCORE | $s_{i-1,0}$ | | |
| INPUT SPEECH FRAMES | i-1 | i | |

KEYWORD RECOGNITION SYSTEM AND METHOD USING TEMPLATE CONCANTENATION MODEL

The U.S. Government has rights in this invention pursuant to Contract No. MDA904-83-C-0475 awarded by Maryland Procurement Office.

This is a continuation of application Ser. No. 07/455,999 filed Dec. 21, 1989, now abandoned, which is a continuation-in-part of application Ser. No. 06/655,958 filed Sep. 28, 1984, also abandoned.

FIELD OF INVENTION

The present invention relates to a system and method for the automatic detection of the occurrence of keywords in input speech, and particularly, to a keyword detection system using an improved keyword recognition algorithm which avoids false detection of keywords in connected speech.

BACKGROUND OF INVENTION

Known keyword recognition systems compare incoming speech to templates which are stored parametric representations of spoken examples (tokens) of keywords to be detected. Typical recognition algorithms seek the closest match (minimum Euclidean distance) between the incoming speech and the keyword templates. Using a method known as "dynamic time warping" (DTW), the recognition algorithms can modify the stored representations of the stored keyword templates into time alignment with representations of the incoming speech. The modified keyword templates are termed time-elastic because they can be either expanded or compressed in time to account for variations in pronunciation or speaking rate. A keyword is "recognized" by the system when a segment of the incoming speech is detected as being sufficiently similar to a keyword template after optimal time alignment.

DTW was originally used for recognition of isolated words with known endpoints, or of words in continuous speech having their endpoints determined by word boundary detection. An example of wordspotting in continuous speech is described in the publication "An Efficient Elastic-Template Method for Detecting Given Words in Running Speech", by J. S. Bridle, published in British Acoustical Society Spring Meeting, April 1973, pages 1-4, which is incorporated by reference. Typically, as each frame i of a segment of incoming speech is received, the wordspotting method uses the DTW algorithm to compute the optimal path to time alignment of the keyword templates and maintains a "dissimilarity score" based on the computed distance of the templates from the segment of input speech. A keyword is declared to have occurred if the dissimilarity score falls below a fixed threshold level.

Systems employing the known wordspotting methods frequently make two types of errors: keywords are spoken but not detected ("misses"); and keywords are detected when they have not been spoken ("false alarms"). Increasing the sensitivity of the system by raising the threshold level to avoid misses tends to increase the rate of false alarms. Wordspotting is particularly difficult when there is a lack of constraints on the input speech, i.e. the speaker is assumed to be non-cooperative.

The DTW method has also been extended to connected speech recognition. Connected speech recognition (CSR) methods attempt to go beyond the constraints of conventional wordspotting by finding the optimal sequence of templates matching a longer segment of continuous or connected speech, such as a phrase or sentence. CSR methods are often employed when it is known in advance that the input speech will be made up of a sequence of vocabulary words for which stored templates exist. All of the stored templates are compared to the input speech, and an optimal template sequence is concatenated by tracking the minimum total distance of the template sequence from the input speech. Such known CSR methods are described in "Partial Traceback and Dynamic Programming", by P. F. Brown, et al., Proc. ICASSP 1982, pages 1629-1632, "Experiments in Connected Word Recognition", by H. Ney, Proc. ICASSP 1983, pages 288-291, and "An Algorithm for Connected Word Recognition", by J. Bridle, et al., Proc. ICASSP 1982, pages 899-902, which are also incorporated herein by reference. Such CSR methods employ dynamic time warping algorithms to determine optimal time alignments, and dynamic programming methods for determining the best matching template sequence producing the minimum accumulated distance from the input speech. "Trace back" of the optimal template sequence and time alignment is applied from the end of the utterance when the utterance has been completed, or from a frame within the utterance. In maintaining a minimum distance score, time alignment distortions may be compensated for by adding fixed penalties for specific types of time axis distortions. When the optimal template sequence has been determined, one or more keywords contained in that sequence are deemed to be "recognized".

Systems employing the known CSR methods frequently give false alarms when the incoming speech contains acoustic patterns of speech that may be similar to those of keywords, e.g. sequences of short syllables, words, or speech sounds which resemble keywords. That is, an "optimal" template sequence may include a keyword template triggered by a similar acoustic pattern of input speech. The frequency of false alarms depends upon the distinctiveness in the language of the keyword acoustic patterns. Another shortcoming of systems employing the known CSR methods is that they require a large amount of computational power, and it is difficult to implement practical systems that operate in real time. All of these shortcomings have restricted the development of keyword recognition systems for practical applications.

SUMMARY OF INVENTION

Therefore, it is a principal object of the invention to provide a keyword recognition system and method using an improved template-concatenation model or algorithm which is less susceptible to false alarms, particularly those due to the acoustic similarity of keywords to other speech patterns or sounds. Another object is to provide such a system and method which does not have high requirements for computational power or time. A specific object of the invention is to provide a system and method using an improved connected speech recognition (CSR) decision procedure.

In accordance with the invention, a system for automatically recognizing a keyword in a speech utterance comprises:

(a) means for inputting a speech utterance in the form of parametric representations of input speech in sequential frames;

(b) filler-template storing means for storing filler templates each indicative of a short speech sound which is not a keyword and is generally shorter than a keyword;

(c) keyword-template storing means for storing keyword templates each indicative of a keyword to be recognized;

(d) template-concatenation means for statistically matching a sequence of frames of input speech with the filler templates and the keyword templates stored in said filler-template and keyword-template storing means, and for concatenating a plurality of candidate strings of filler and keyword templates acceptably matching the sequence of input speech, said plurality including candidate strings containing different sequences of filler and keyword templates which test both hypotheses of a keyword being present and of not being present in the input speech; and (e) scoring means for accumulating dissimilarity scores for each of the respective candidate strings representing the dissimilarity of a candidate string from the input speech; and (f) recognition means for determining when an optimal candidate string has a total dissimilarity score which is less than the total dissimilarity scores of all the other candidate strings, and for recognizing a keyword in the input speech based upon a corresponding keyword template being contained in the optimal candidate string.

The keyword recognition system and method of the invention employs a more powerful keyword decision procedure than the known CSR methods. By maintaining a plurality of candidate strings made up of different sequences of keyword and filler templates, the decision procedure evaluates not only the hypothesis that a keyword has occurred in the input speech, but also the hypothesis that the observed speech may be a pattern of shorter speech sounds that is not a keyword. A novel language model is used to evaluate the latter hypothesis. Arbitrary patterns of speech sounds are approximated in candidate strings by concatenating filler templates. A candidate string containing a keyword must have a better dissimilarity score than all other candidate strings containing filler sounds in order for the keyword to be recognized as occurring in the observed speech. This decision procedure significantly reduces the likelihood of a false recognition of a keyword.

In the preferred system, the scoring procedure adds a penalty for each template in the string in order to bias the score in favor of a string having a lower number of templates, i.e. containing one or more templates that are longer keywords. By selecting the optimal candidate string having a total dissimilarity score less than those of the other candidate strings, the scores of the other candidate strings in effect serve as a variable threshold which reduces the likelihood that a false recognition of a keyword in a candidate string will occur.

The disclosed system also incorporates DTW methods for automatic keyword recognition of unrestricted natural speech which may vary in pronunciation or speaking rate. Dynamic programming algorithms (DPA) are used for the concatenation of candidate strings of templates acceptably matching the input speech. The system also uses segmentation and statistical clustering methods for generating the stored templates, and can be trained to a designated speaker or function independently of any designated speaker.

BRIEF DESCRIPTION OF DRAWINGS

The above objects and further features and advantages of the invention are described in detail below in conjunction with the drawings, of which.

DETAILED DESCRIPTION OF INVENTION

In the following description, the invention is applied to recognition of keywords in continuous or connected speech, such as in a spoken phrase or sentence. Known dynamic time warping (DTW) methods are used for time alignment with unrestricted speech input, and dynamic programming algorithms (DPA) are used for concatenating sequences of templates as the frames of a speech utterance are sequentially input. However, the principles of the invention may also be applied to systems for recognizing isolated words or words in continuous speech delimited by word boundary detection, as well as to other types of speech recognition systems with or without time alignment or dynamic programming methods.

As a general concept, the keyword recognition system and method of the invention employs a general language model for all speech sounds in a designated language, not only for keywords to be recognized. The invention measures the similarity between the incoming speech and a plurality of candidate strings of filler and keyword templates to test the hypothesis of a keyword being present against that of a keyword not being present in the input speech. As alternatives to a candidate string containing a keyword template, other candidate strings are assembled with filler templates according to the general language model to approximate speech sounds that may be similar to a keyword. A keyword is "recognized" only when an optimal candidate string containing the corresponding keyword template is determined to match the input speech more closely than the other candidate strings of the general language model.

The general language model consists of a set of, for example, between 50 and 500 short segments of previously-recorded speech sounds derived from training utterances. These short segments are referred to as filler templates. They are chosen with the goal of encompassing the range of acoustical sounds likely to be uttered by a speaker of the language. This is done, for example, by known methods of segmentation and statistical clustering analyses of the training utterances. The duration of the filler sounds lies in the range between phonemes and the duration of syllables. Acoustic patterns of input speech can be approximated by concatenations of the filler templates without restriction on their order. The use of filler templates representing short sounds of a general language model as an alternative hypothesis to a keyword is a unique feature of this invention.

For purposes of illustration, the invention is implemented using a modified connected speech recognition (CSR) system. The CSR system concatenates a sequence of filler and keyword templates that acceptably matches the input speech, for example, as described in copending U.S. applications Ser. No. 439,018 of G. Vensko et al., filed Nov. 3, 1982, which issued as U.S. Pat. No. 4,567,606 on Jan. 28, 1986, and Ser. No. 473,422, of G. Vensko et al., filed Mar. 9, 1983, which issued as U.S. Pat. No. 4,624,008 on Nov. 18, 1986, both commonly assigned to ITT Corporation and incorporated herein by reference. In the near-ideal, that is, near-zero error-rate operation of the CSR system, keyword templates match the spoken keywords, and filler templates match all the remaining speech sounds. A keyword is declared to have been spoken when the corresponding keyword template appears in a best-matching template sequence.

The present invention employs the above-referenced CSR system with the following modifications: (a) a plurality N of candidate template sequences or strings are maintained, to test the hypotheses of the presence of a keyword as well as of sound pattern alternatives to a keyword; (b) each time a new template is concatenated to a partial candidate string, a fixed penalty is added to the partial string score in order to bias the score in favor of a candidate string containing one or more longer, keyword templates; and (c) the optimal candidate string having the lowest dissimilarity score of all the candidate strings is selected as the best-matching template string.

Figure 1:
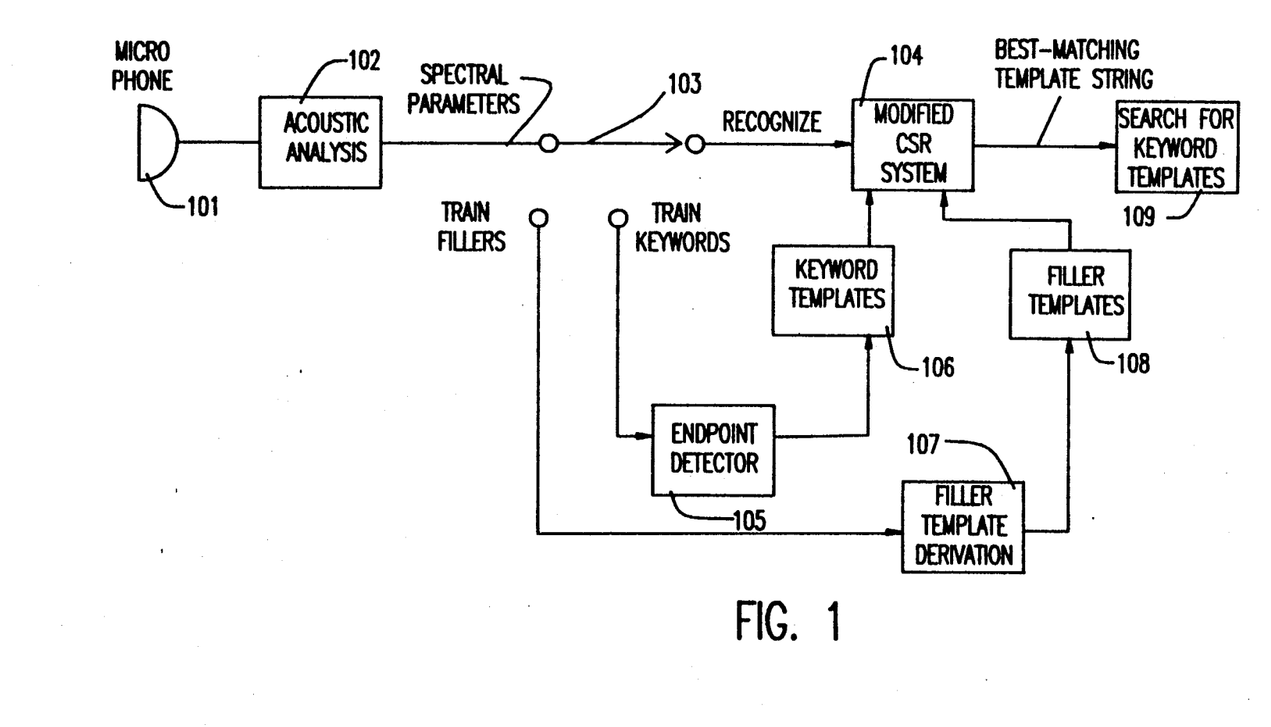
FIG. 1 is a schematic diagram of a keyword recognition system in accordance with the invention.

A block diagram of a preferred form of the keyword recognition system of the invention is shown in FIG. 1. Input speech from the microphone 101 is provided to the input of an acoustic analyzer at block 102, which divides the input speech into a series of short frames and provides parametric representations for each frame of input speech at its output. The particular type of acoustic analysis performed by the analyzer is not critical to the invention, and known acoustic analyzers may be employed such as those disclosed in the aforementioned copending Vensko et al. patents. For example, a 16-channel bandpass filterbank analysis, with a frame period of 10 milliseconds, may be used to derive frames of spectral parameters of the input speech. The frames of spectral parameters are processed in one of three modes of system operation as selected by the selector switch 103. The three modes of operation are Recognize mode, Train Keyword Templates mode, and Train Filler Templates mode.

In the Recognize mode, the spectral parameter output of the acoustic analyzer 102 is provided to the input of the modified CSR system 104 as generally described above. The CSR algorithm for concatenating a string of templates acceptably matching the input speech performed by the modified CSR system 104 is not critical to the invention, except for the modifications mentioned previously. Any of the existing CSR systems that are based on the principle of dynamic programming may be used, such as those disclosed in the Vensko et al. patents incorporated by reference. In accordance with the invention, the CSR system is modified to assemble a plurality N of candidate strings of templates including keywords and filler sounds of the general language model, and to select the template string which best matches the input speech. The modified CSR system is described in greater detail below.

Modified Connected Speech Recognition (CSR) System

Figure 2:
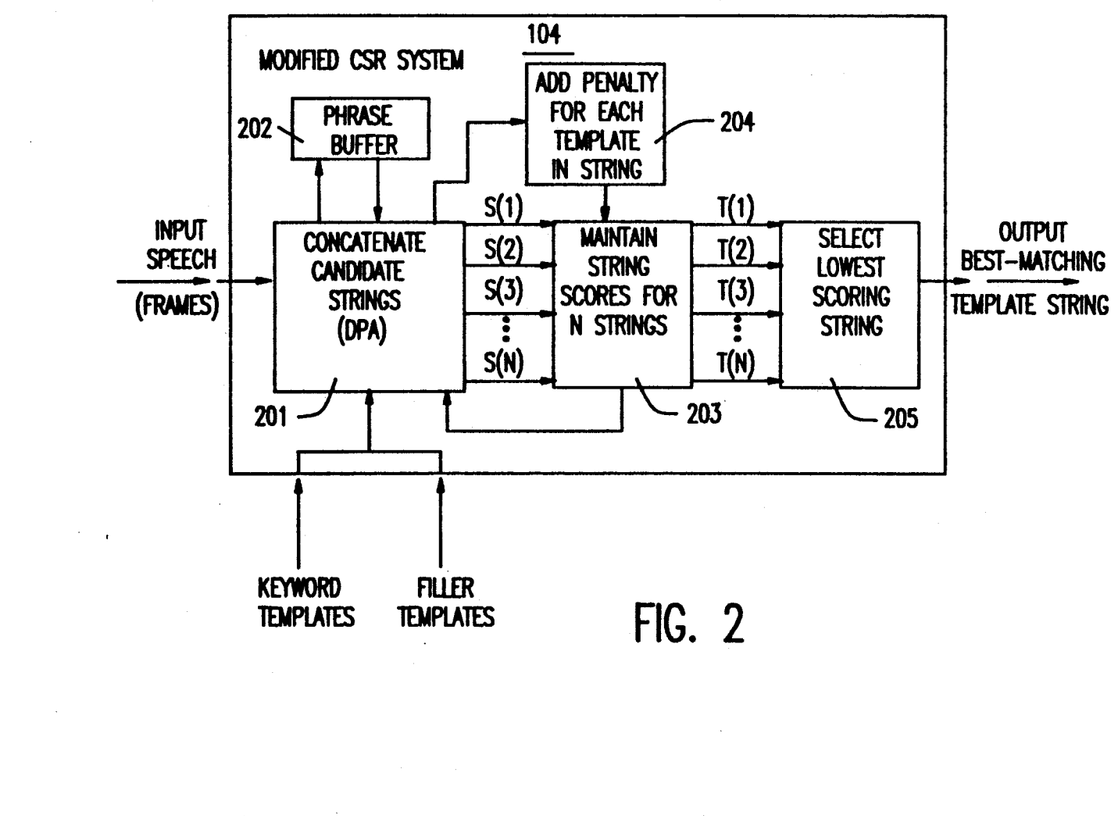
FIG. 2 is a schematic diagram of a modified connected speech recognition (CSR) system used in the overall system of FIG. 1.

A preferred implementation of the modified CSR system 104 is illustrated in FIG. 2. A CSR module 201 concatenates a plurality N of candidate template strings using a dynamic programming algorithm (DPA) to compare the frames of input speech to the stored keyword and filler templates. The number N is a selected engineering parameter and may have a typical value, for example, of 20. The DPA performs scoring and matching of input frames to templates on a continuous basis. No distinction is made between keyword templates and filler templates. The DPA maintains and continuously updates a phrase buffer 202 that lists the template sequences and alignments of the candidate strings best matching the acoustic history of the input speech from the beginning of the utterance to the current frame. Each candidate string may contain any combination of filler and keyword templates and has an associated distance score. The accumulated distance scores are computed with each frame and represent how well the candidate strings match the history of input speech up to that frame. Partial string ("dissimilarity") scores $S(1), \ldots S(N)$ are maintained, as shown at block 203, based on the accumulated distance scores. At the last frame of the utterance, the total string scores $T(1), \ldots T(N)$ are compared, as indicated at block 205, and the optimal candidate string with the lowest (best) total score is selected. The corresponding best-matching template string is output from the modified CSR system. A keyword is declared to have been recognized for each keyword template (if any) in the optimal template string.

An important feature of the invention is a modification to the DPA program of the CSR system to add a "concatenation penalty", as indicated at block 204, to the partial string scores each time a template is added to a string. The added penalty is a mechanism for biasing the modified CSR system in favor of matching the input speech using fewer concatenated templates, i.e. with a string containing one or more keyword templates. Without this bias, keywords in the input speech are often matched by concatenations of filler templates, instead of by the appropriate keyword templates. This bias produced by the added penalty gives keyword templates a "competitive advantage" over filler templates because of their longer durations. Fewer concatenations are required, and therefore a smaller penalty is incurred, when keyword templates are used.

The output of the modified CSR system 104 is a string of template labels each representing one template in the best-matching template sequence. For example, each template may be assigned a number, and the label may be a multi-bit representation of that number. This output is provided to a keyword template search sub-system 109 which, for the example of multi-bit representation of template numbers, may be a multi-bit comparator with a storage for keyword template labels that compares each incoming template label with the stored keyword template labels. If a keyword is contained in the input speech, the sub-system 109 accordingly provides an indication as to which keyword was spoken.

In order to be selected, the optimal string must yield a lower total score T lower than all the other template strings, including strings with only filler templates. That is, for a keyword to be recognized, the accumulated score for the template sequence containing the keyword must be lower than the scores for any other template sequence over the interval of the utterance. For any given interval and a given keyword, the scores of the other template sequences can be considered as a threshold below which the template sequence containing the keyword must score in order for the keyword to be recognized.

As the content and length of interval of input speech change, the scores of the template strings will change. Thus, the threshold which produces recognition of a keyword varies over time depending on the content and length of the interval. This content- or time-varying threshold produces significantly improved results over prior CSR systems which can trigger a false detection of a keyword by matching a keyword template to similar-sounding speech sounds based upon a dissimilarity score below a fixed threshold level.

Figure 3A:
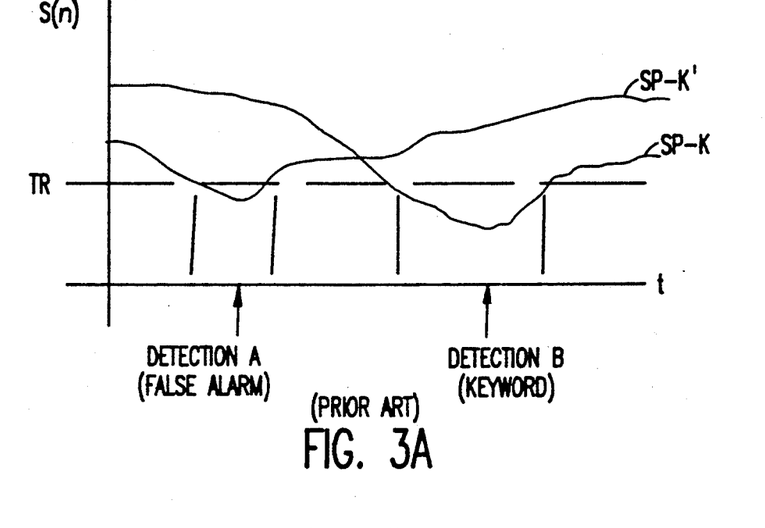
FIGS. 3A and 3B are schematic diagrams comparing keyword detection relative to a fixed threshold in the prior art and keyword detection relative to a variable threshold set by a general language model as used in the invention.
Figure 3B:
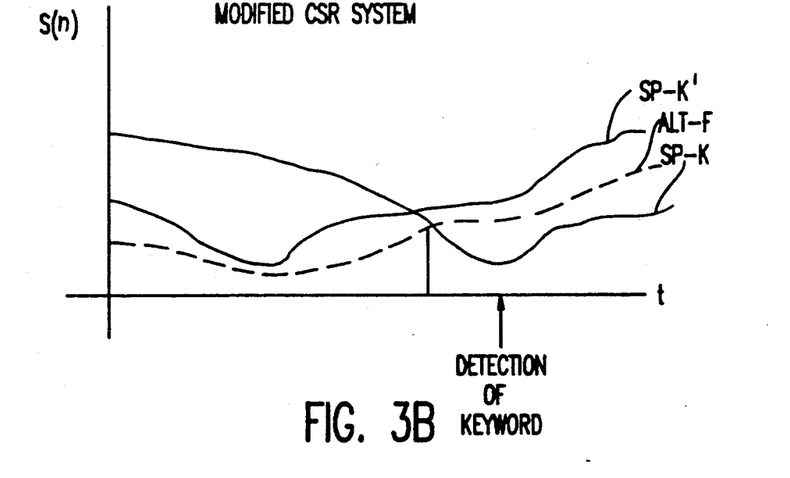

This difference is illustrated by comparison of FIGS. 3A and 3B showing hypothetical examples of dissimilarity scores S(n) for template sequences over an interval of time. In the prior art CSR system of FIG. 3A, a fixed threshold TR is used for keyword detection at event B when the score for a template sequence SP-K for input speech containing a keyword dips below the threshold. However, it produces a false detection at A when the score for the template sequence SP-K', which includes a keyword template for input speech sounding similar to a keyword, also dips below the threshold TR. In contrast, in FIG. 3B, the modified CSR system of the invention produces a detection event only when the template sequence SP-K for input speech containing the keyword has a score below that of the alternative template sequence ALT-F representing arbitrary sounds of the general language model that approximate the input speech with filler templates. The template sequence SP-K' containing a keyword template when no keyword has been spoken does not trigger a false detection because its dissimilarity score does not fall below the variable threshold set by the alternative template sequence ALT-F of the general language model. In other words, if the input speech contains speech sounds other than a keyword, an alternative template sequence of filler sounds will produce a lower dissimilarity score than the template sequence erroneously containing the keyword template, thereby avoiding false detection of the keyword.

The invention thus addresses the shortcomings of the known methods by employing a more powerful decision procedure for keyword detection in which the hypothesis of the presence of a keyword is tested against the alternative hypothesis that the input speech contains arbitrary speech sounds, rather than against a fixed threshold. In other words, whereas the known CSR methods estimate the conditional probability of the acoustic data being a keyword, the invention estimates the conditional probability of the keyword as against the acoustic data. The latter approach of the invention better provides the information that is needed for keyword detection. The invention also eliminates redundant calculations that were performed in the known methods. The increased efficiency reduces the required computation by an order of magnitude.

Dynamic Programming Algorithm (DPA)

A preferred implementation of the template-concatenation and scoring procedures for the modified CSR system will now be described in more detail. The modified CSR system can employ a dynamic programming algorithm (DPA), for example, as disclosed in the Vensko et al. patents mentioned previously. In the template-matching process, the DPA can stretch or compress the templates (within limits) for optimal alignment with the input speech by using well known DTW methods. The DPA can also constrain the sequence of templates that can be matched according to a finite-state syntax, e.g. a syntax consisting of nodes associated with permitted templates which are connected to form syntactic phrases. The phrase buffer 202 in FIG. 2 is a linked list of developing phrase options. For each input frame, a predefined maximum number of phrase options are stored in the phrase buffer in increasing order of their scores. At most one option is saved per node. Each option represents a string of templates ending at that node, with specified alignment ending at the current frame.

Figure 4:
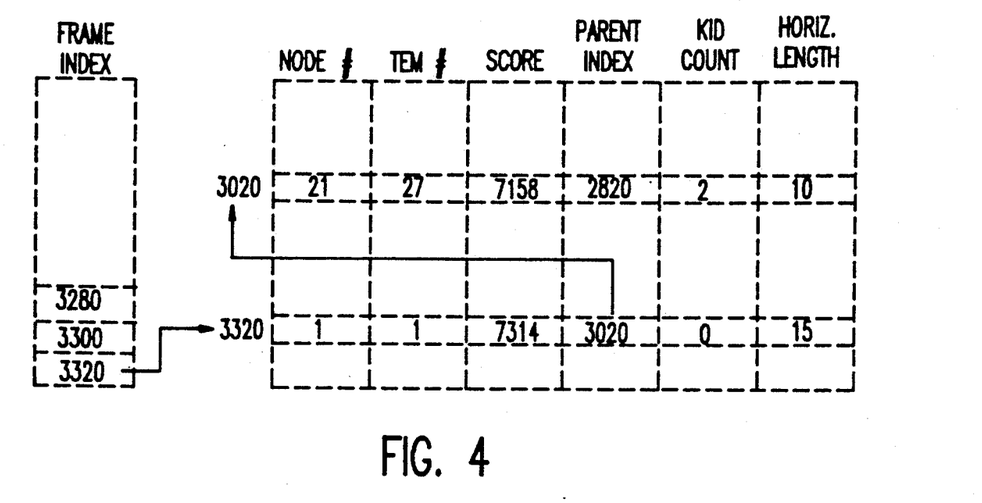
FIG. 4 is a diagram illustrating the organization of phrase buffer data for the modified CSR system.

As illustrated in FIG. 4, the phrase options may consist of a node number, template number, score, parent pointer, and other information. The node number and template number refer to the last template in the string of templates ending at the current frame. The parent pointer is the index in the phrase buffer of the parent option, saved at an earlier frame. The parent option represents the template substring up to but not including the last template of the current option. At any input frame, a matching template string up to that frame can be determined by recursively following the parent pointers from the current option back to the syntax start node.

Figure 5:
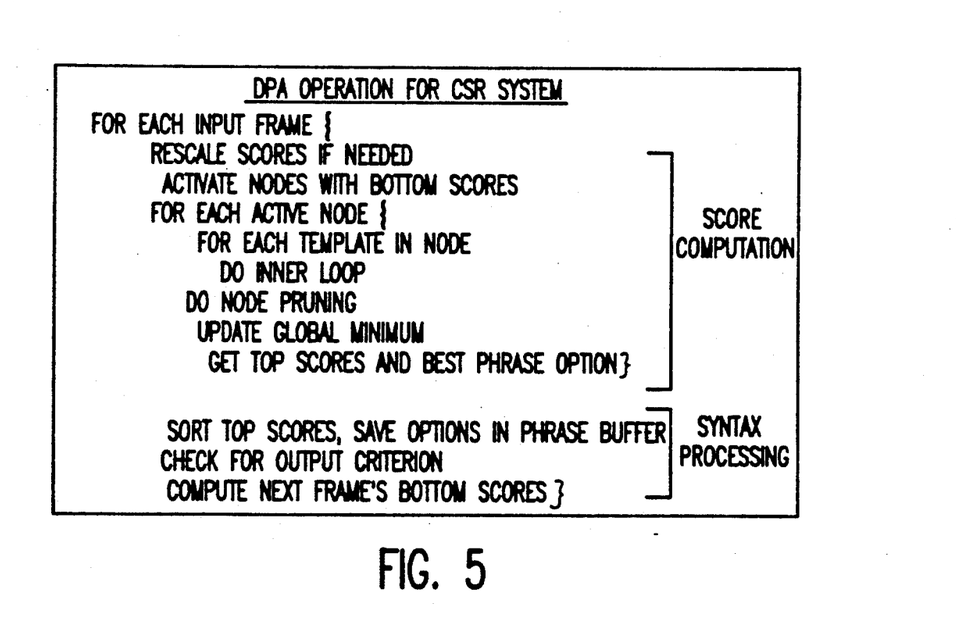
FIG. 5 is a chart of the template-matching procedure performed according to a dynamic programming (DPA) model used in by the modified CSR system.
Figure 6:
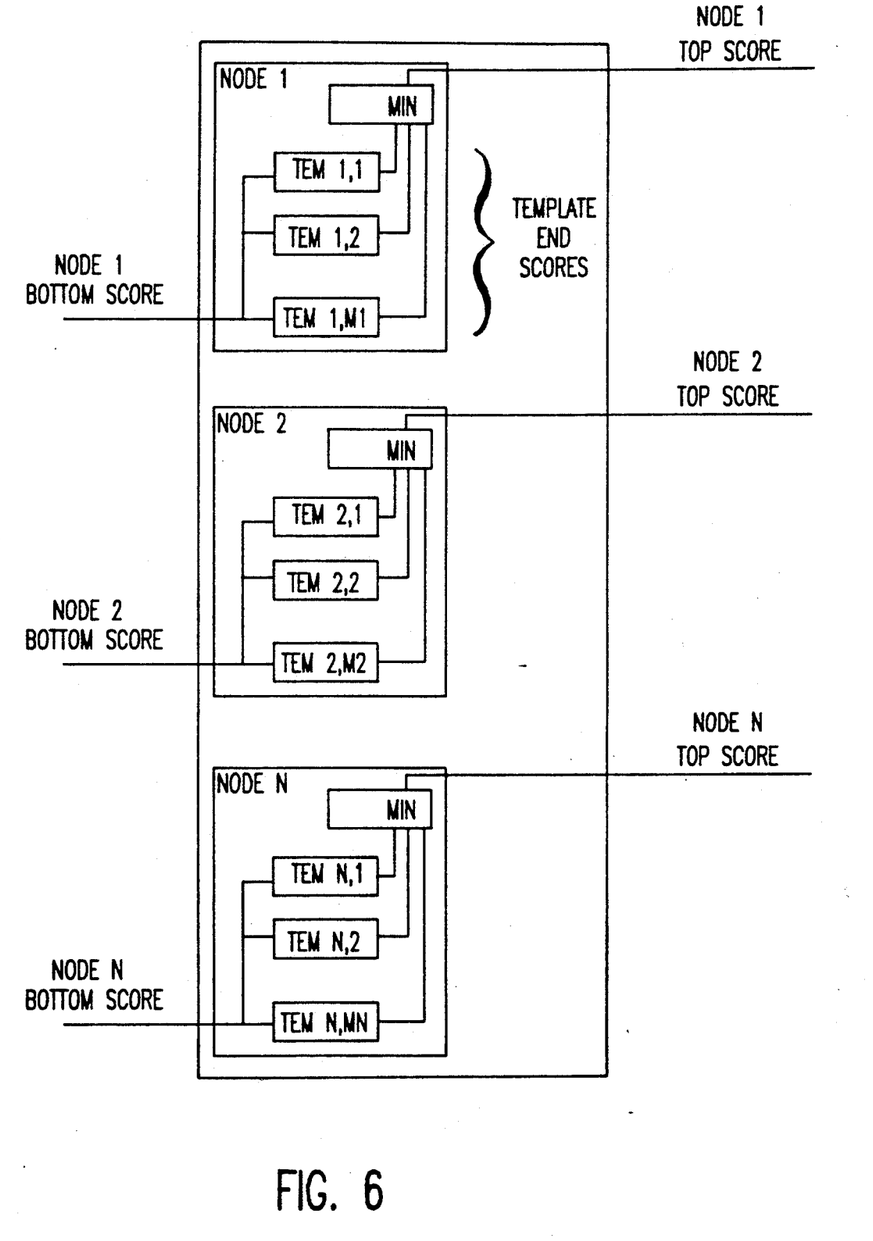
FIG. 6 is a diagram illustrating the DPA scoring computations for the template-matching procedure.

Referring to FIG. 5, the DPA program is designed to operate by processing input frames sequentially. The DPA operations performed at each frame are categorized as scoring computations and syntax processing. Scoring computations may be thought of as operating on bottom scores and producing top scores, while syntax processing operates on top scores and produces bottom scores for the next frame. As shown in FIG. 6, the processing of each template at an active node starts with a bottom score from a node immediately preceding it in the syntax, and produces template end scores representing the accumulated distance scores for the respective templates. The minimum of the template end scores is selected as the minimum top score for the node. All templates are compared for matching at each active node in this manner. The minimum top score represents a template deemed to be best matching and to be reserved as a phrase option at that node. At each input frame, the DPA saves only one top score and corresponding best phrase option per node. Alternate phrase hypotheses ending with templates in the same node compete with one another on the basis of their template end scores. The lowest template end score is saved as the node's minimum top score, and the corresponding phrase hypothesis is saved in a list of possible options maintained in the phrase buffer.

Figure 7:
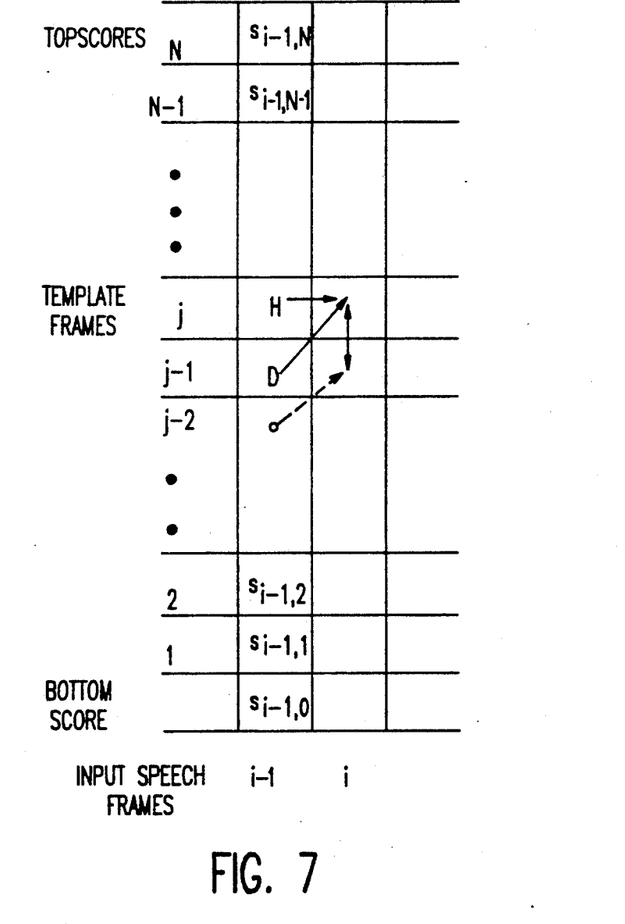
FIG. 7 is a diagram illustrating the DPA scoring matrix for the template-matching procedure.

As illustrated by the DPA scoring matrix shown in FIG. 7, the score of accumulated (Euclidean) distance s(i,j) of a template is computed sequentially for each cell of a matrix defined by incoming frame i and template frame j. The input frame index i is advanced in an outer loop, and the template frame index j is advanced in the inner loop. Constraints on the degree of compression and expansion of the match path, and also on the "curvature" of the path, are implemented by allowing a horizontal "h" or a vertical "v" move only if the previous move was a diagonal "d" move. The move actually made is selected from the allowable ones by choosing the one that results in the minimum distance score.

The lowest running score in a node is called the node minimum score, and the lowest node minimum over all nodes is called the global minimum score. If the node minimum score exceeds the global minimum score by more than a predefined constant, the node is "pruned" so that it cannot produce a top score or phrase option. Since the running scores are monotonically non-decreasing, provision is made to avoid numerical overflow by score rescaling whenever the global minimum score exceeds a predefined constant. To perform rescaling, the global minimum score is subtracted from every running score.

Figure 8:
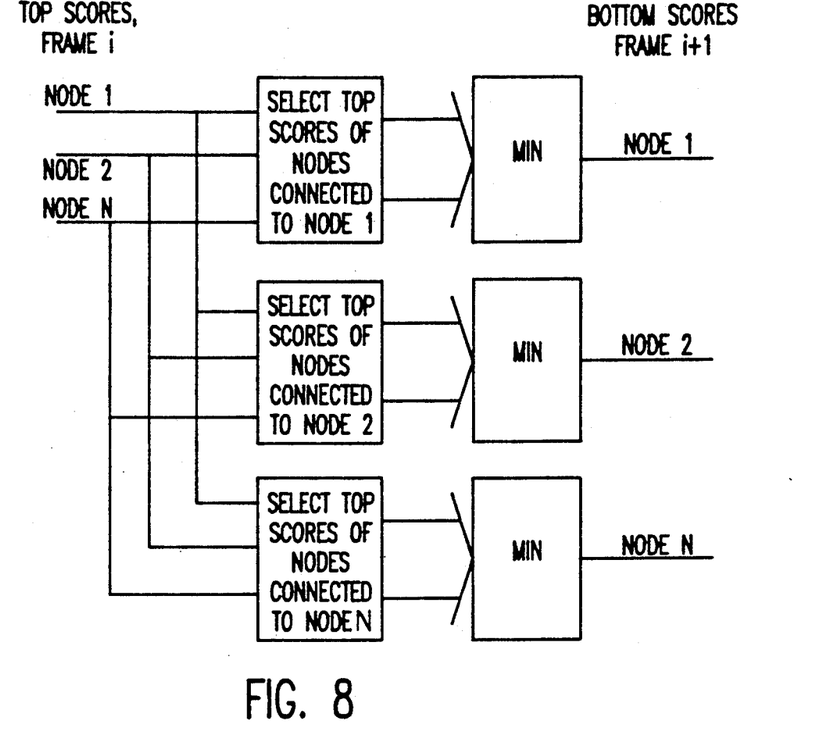
FIG. 8 is a diagram illustrating a syntax processing step in the template-matching procedure.

Syntax processing begins by sorting the list of possible options saved during scoring in increasing order of their top scores. Up to a fixed number of phrase options (corresponding to the selected number of candidate template strings) are saved in the phrase buffer. Well known methods are available to "trace back" from a current input frame to determine the optimal template sequence and time alignment up to that frame. Trace back is applied from the end of the utterance when the utterance has been completed, or from a frame within the utterance for a template sequence leading up to that frame. The syntax processing algorithm checks to determine whether end-of-phrase criteria have been satisfied, for example: (1) the top score of the final node must be equal to the global minimum score, and (2) the traceback path from the best phrase option must remain in the final node for a given number of consecutive loops. These criteria assume that the start and final nodes are self-looping in the syntax and contain silence templates. The utterance is deemed complete when a given number of frames of silence is recognized representing the end of the phrase. If the utterance is continuing, bottom scores are computed for the scoring computations of the next input frame. For each node, the algorithm determines which, if any, of the current phrase options could be syntactically extended to that node. The minimum top score of these permitted options becomes the node's bottom score at the next input frame, as shown in FIG. 8.

The DPA recurrence equations for the accumulated distance scores in the modified CSR system of the invention are the same as used in existing DPA techniques, for example, as disclosed in the Vensko et al. patents, with the exception that the concatenation penalty P is added each time a transition is made from the last frame of the previous template in a template sequence to the first frame of the next template being matched. The value of the concatenation penalty may be a constant value and may be adjusted to achieve a desired operating point for the system.

Figure 9:
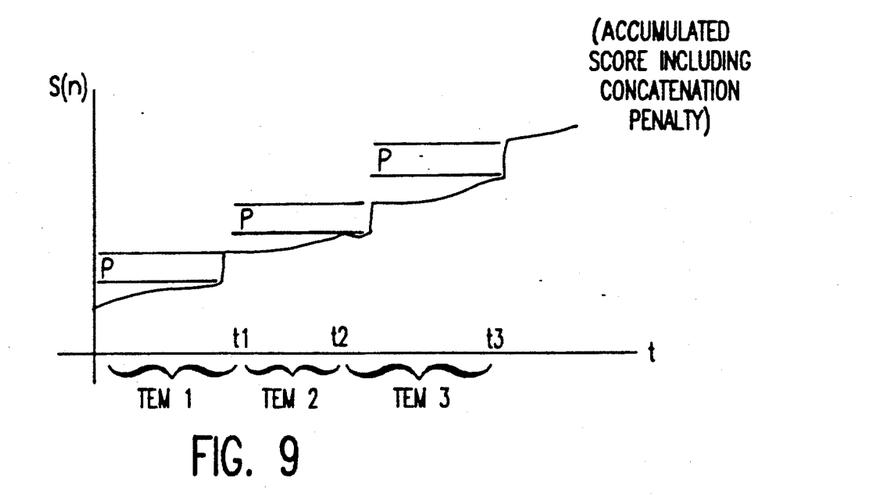
FIG. 9 is a diagram illustrating the addition of a concatenation penalty in accordance with the invention.

In FIG. 9, the effect of the addition of the concatenation penalty on the accumulated score for a candidate template string is illustrated. The input speech is matched to a concatenation of templates TEM1, TEM2, TEM3, . . . , with transitions between the templates at times t1, t2, t3. The penalty P is added to the accumulated score at each transition. Viewing the templates as the states of a Markov model, the concatenation penalty is analogous to a log transition probability. Using fixed penalties for added templates is equivalent to assuming that all transitions are equally probable. The effect of the penalty is therefore inversely proportional to the log of the number of templates. It increases the likelihood of recognizing longer templates, i.e. keywords, as compared to shorter templates, i.e. filler sounds, since fewer penalties are incurred. The penalty thus provides a means of adjusting the operating point of the system for keyword detection. Since both the probability of correct detection and false alarms increases as the penalty increases, a suitable tradeoff is determined as the operating point of the system.

Figure 10:
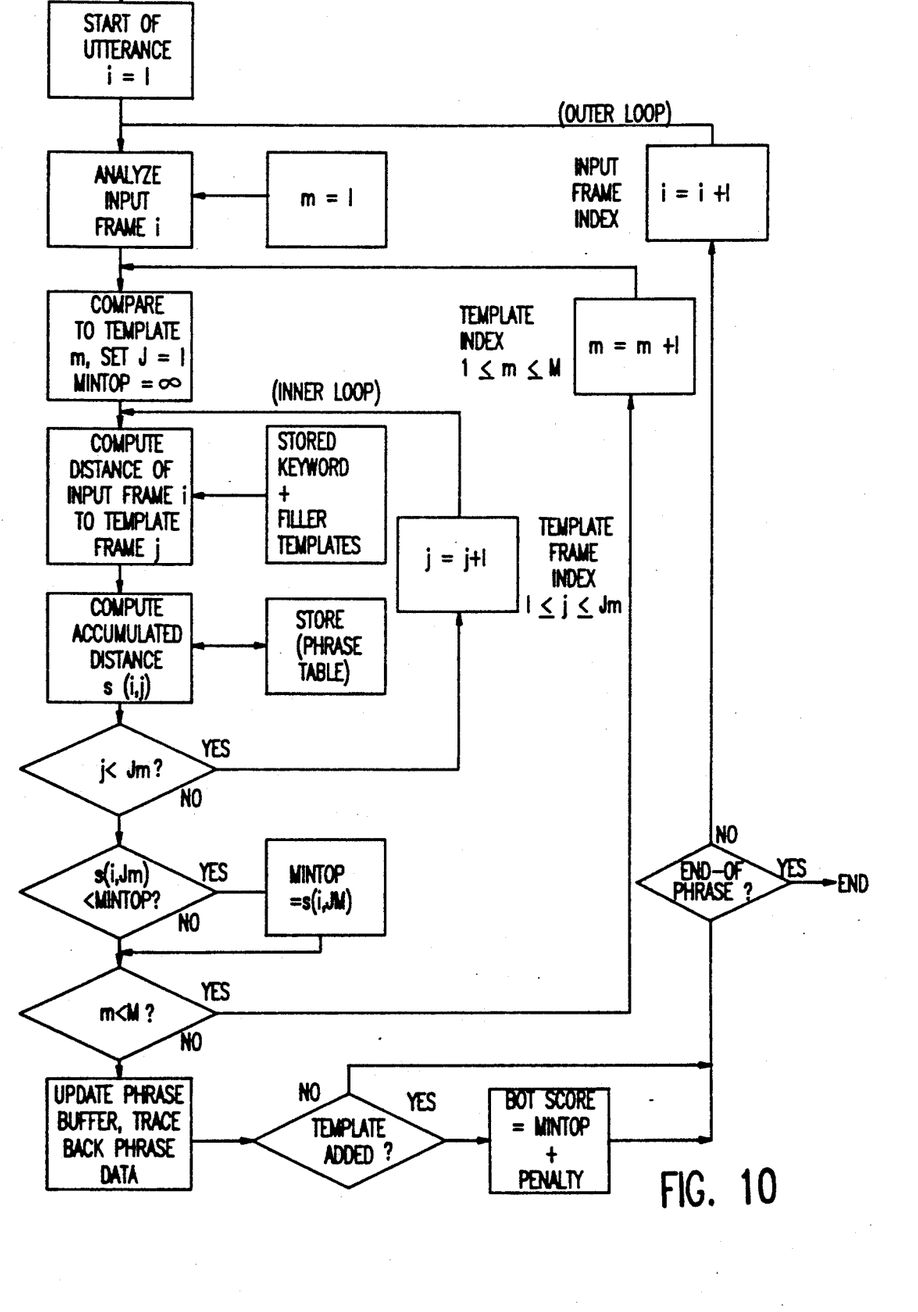
FIG. 10 is a flow diagram illustrating the overall DPA design for the template-matching procedure.

In FIG. 10, a flow diagram summarizes the overall design of the DPA operation for the modified CSR system.

Keyword Template Derivation

Referring again to FIG. 1, in the Train Keyword Templates mode, the user causes keyword templates to be prepared and stored in the system. In a typical implementation of this mode, the user speaks each keyword in isolation and the spectral parameter output of the acoustic analyzer 102 is provided to the input of, for example, an energy-based endpoint detector 105, such as the detector described in the above-referenced copending Vensko et al. applications. When the endpoints of the keyword are determined by the detector 105, the spectral parameters of each keyword are then stored as keyword templates in the associated storage 106. The templates of the keyword-template storage 106 can then be accessed by the modified CSR system 104 in the Recognize mode.

Filler Template Derivation

In the Train Filler Templates mode, a typical implementation allows the user to speak any arbitrary utterance long enough to contain a reasonable sampling of sounds in the language. A paragraph of read text is suitable, and it need not contain the keywords. The sequence of spectral parameters from the acoustic analyzer 102 is provided to the input of a filler-template derivation subsystem 107, which divides the sequence of spectral parameters into short segments to be used as filler templates. For example, 50 filler templates may be derived where each template has 4 frames. Increasing the number of filler templates increases accuracy while also increasing computation load. The derived filler templates are stored in the associated storage 108 where they can be accessed by the modified CSR system 104 in the Recognize mode.

One method for accomplishing the task of filler-template derivation is to manually mark syllables of the training utterance by visual inspection of a spectrogram of the utterance. The resultant segments correspond approximately to syllables, and a set of them are chosen with the objective of representing a wide variety of different sounds to be stored as filler templates.

Figure 11:
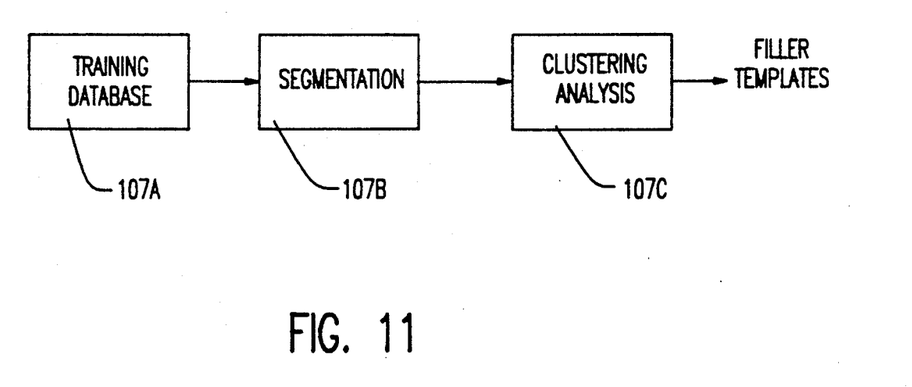
FIG. 11 is a diagram illustrating filler template derivation for the modified CSR system.

Another method of filler-template derivation can be implemented for automatic operation by a two-stage procedure executed on a computer. As illustrated in FIG. 11, speech data from the training database 107A are first divided into segments by segmentation analysis 107B. These segments are then applied as input for statistical clustering analysis 107C, which selects a subset of the segments that maximizes a mathematical function based on a measure of distance between segments. The segments belonging to the selected subset are then used as filler templates. The performance of the manual and automatic methods of deriving filler templates are found to be nearly equal, indicating that the method of selecting filler templates may not be critical. Also, the methods used for automatic segmentation and statistical clustering analysis may be implemented in a number of different ways and are not critical to the invention.

In one method for performing the segmentation, the training database 107A, which stores the general language input provided from the acoustic analyzer, is divided into equal-length segments, for example, 100 milliseconds, by the segmentation circuit 107B. In another method, the segments may have unequal lengths, and the segmentation boundaries may instead be chosen based on measurements of the rate of spectral change. Other algorithms can of course be devised to accomplish segmentation. The common objective is to create short segments where the voiced spectrum is changing quickly and longer segments where the spectrum is changing slowly.

In still another method of segmentation, a set of prototype segments derived from the speech of a large set of speakers is employed. The prototype segments are used as templates and matched, using the CSR system, to the training utterance. Segment boundaries are marked between frames of the test utterance that are matched to boundaries between the concatenated prototype segments.

Statistical clustering analysis is performed by analyzer 107C to choose a set of output segments that is relatively representative of the large set of input segments supplied by the segmentation procedure. On method of performing the statistical clustering analysis is to select the output segments so as to minimize the average distance between input segments and their nearest output segments, by employing the known K-means algorithm as disclosed in the statistics literature.

Another method of performing statistical clustering analysis, known as covering analysis, selects a set of segments that covers the training data and ensures that the distance between any input segment and the closest output segment is less than a specified tolerance. The density of the training data in the vicinity of each selected segment is then computed, and a further selection is made of the segments for which the density is the greatest. For example, in one method of covering analysis, the first input segment is declared to be an output segment. Then each subsequent input segment is compared with all the output segments, which is initially only one. If the distance to the nearest output segment is greater than the specified tolerance, then that input segment is added to the set of output segments. In both the K-means and covering analysis methods, the measure of distance between segments is the average squared-Euclidean distance between corresponding frames of the segments.

It is beneficial, but not necessary, to augment the set of filler templates derived using the aforementioned procedure by creating additional filler templates from segments of the keyword templates. For example, this can be done by dividing each keyword template into equal-length segments whose duration is roughly equal to the average duration of the filler templates. The keyword segments are then used directly as additional filler templates.

In practice, the modified CSR system of the invention was found to produce surprisingly good performance for a number of speakers despite use of a low number (50) of filler templates derived from training data supplied from a different speaker of less than one minute duration. Correct detection probabilities of 80–90% with false alarm probabilities of 30–40% were obtained. More accurate detection with lower likelihood of false alarms can be obtained by enhancing the training input and filler template derivation and adjusting the operating point of the system.

The invention is thus suitable for wordspotting applications in speaker-independent environments, for example, the control of machine operation by spoken commands or control words, such as placing telephone calls by voice, voice control of office equipment, machines, or toys. The invention may also be used in environments with relaxed syntactic constraints. In many applications, the intent of the message may be carried by a small subset of words. In these applications, decoding of the message can be guided by recognition of the limited set of keywords. The user need not refer to complicated phrase syntax. Such a capability would be particularly valuable in systems that depend upon man-machine dialog.

The invention may also be employed for automated reservation systems, computer-aided instruction systems, and information retrieval systems. A further application is the automatic extraction of the gist of conversations. A still further application is the automatic extraction of reference templates from naturally-spoken phrases, for use in speech recognition systems, and for the automatic updating of reference templates in continuous speech recognition systems.

The specific embodiments of the invention described herein are intended to be illustrative only, and many other variations and modifications may be made thereto in accordance with the principles of the invention. All such embodiments and variations and modifications thereof are considered to be within the scope of the invention, as defined in the following claims.

We claim:

1. A system for automatically recognizing a keyword in a speech utterance comprising:
   (a) means for inputting a speech utterance in the form of parametric representations of input speech in sequential frames;
   (b) filler-template storing means for storing filler templates each indicative of a short speech sound which is not a keyword and is generally shorter than a keyword; (c) keyword-template storing means for storing keyword templates each indicative of a keyword to be recognized;
   (d) template-concatenation means for statistically matching a sequence of frames of input speech with the filler templates in said filler-template storing means, on the one hand, and the keyword templates in said keyword-template storing means, on the other, and for concatenating a plurality of candidate strings of filler templates, on the one hand, and keyword templates, on the other, each acceptably matching the sequence of input speech, said plurality including candidate strings containing different sequences of filler and keyword templates which test both the hypothesis of a keyword being present and the alternate hypothesis of the input speech more closely matching an acoustic pattern of speech that is similar to the keyword, but does not actually contain the keyword;

(e) scoring means for accumulating dissimilarity scores for each of the respective candidate strings representing the dissimilarity of a candidate string from the input speech; and (f) recognition means for determining when an optimal candidate string has a total dissimilarity score which is less than the total dissimilarity scores of the other candidate strings, and for recognizing a keyword in the input speech based upon a corresponding keyword template being contained in the optimal candidate string.

2. A system according to claim 1, further comprising filler-template derivation means for inputting an arbitrary training utterance in a given language and for deriving filler templates representing short speech sounds obtained from said arbitrary training utterance.

3. A system according to claim 2, wherein said filler-template derivation means includes a segmentation module for segmenting said arbitrary training utterance into short segments, and a statistical clustering analysis module for selecting a subset of said short segments as filler templates based upon a statistical clustering model.

4. A system according to claim 1, further comprising keyword-template derivation means for inputting spoken keywords and for deriving keyword templates from the spoken keyword input.

5. A system according to claim 4, wherein said keyword-template derivation means includes a word endpoint detector for detecting respective endpoints of the spoken keyword input.

6. A system according to claim wherein said scoring means includes means for adding a penalty to the partial string scores of the candidate strings for each template added to a respective string in order to bias the score in favor of a string having a lower number of templates.

7. A system according to claim 1, wherein said template-concatenation means includes a DPA module for performing template matching and concatenation using a dynamic programming algorithm.

8. A system according to claim 7, wherein said template-concatenation means includes means for evaluating phrase options for the template sequences according to a given syntax.

9. A system according to claim 8, wherein said template-concatenation means includes a phrase buffer for tracking phrase options corresponding to template sequences having the lowest dissimilarity scores, and selecting the best-matching phrase options as said candidate strings.

10. A system according to claim 1, wherein said means for inputting a speech utterance includes an acoustic analyzer for receiving an audio input of the spoken utterance and providing an output of frames of spectral parameters representing the input speech.

11. A method for automatically recognizing a keyword in a speech utterance comprising the steps of:

(a) inputting a speech utterance in the form of parametric representations of input speech in sequential frames;

(b) storing filler templates each indicative of a short speech sound which is not a keyword and is generally shorter than a keyword;

(c) storing keyword templates each indicative of a keyword to be recognized;

(d) statistically matching a sequence of frames of input speech with the stored filler templates, on the one hand, and the stored keyword templates, on the other and concatenating a plurality of candidate strings of filler templates, on the one hand, and keyword templates, on the other, each acceptably matching the sequence of input speech, said plurality including candidate strings containing different sequences of filler and keyword templates which test both the hypothesis of a keyword being present and the alternate hypothesis of the input speech more closely matching an acoustic pattern of speech that is similar to the keyword, but does not actually contain the keyword;

(e) accumlating dissimilarity scores for each of the respective candidate strings representing the dissimilarity of a candidate string from the input speech; and (f) determining when an optimal candidate string has a total dissimilarity score which is less than the total dissimilarity scores of the other candidate strings, and recognizing a keyword in the input speech based upon a corresponding keyword template being contained in the optimal candidate string.

12. A method according to claim 11, further comprising the step of deriving the filler templates from short speech sounds obtained from an arbitrary training utterance in a given language.

13. A method according to claim 12, wherein said filler-template deriving step includes the substeps of segmenting the arbitrary training utterance into short segments, and selecting a subset of said short segments as filler templates based upon a statistical clustering model.

14. A method according to claim 13, wherein said filler-template deriving step includes the substep of covering analysis.

15. A method according to claim 13, wherein said filler-template storing step includes the substep of deriving additional filler templates from short segments obtained from the keyword templates.

16. A method according to claim 11, further comprising the step of deriving keyword templates from spoken keyword input.

17. A method according to claim 11, wherein said scoring step includes the substep of adding a penalty to the partial string scores of the candidate strings for each template added to a respective string in order to bias the score in favor of a string having a lower number of templates.

18. A method according to claim 11, wherein said template-matching and concatenation step includes performing template matching and concatenation using a dynamic programming algorithm.

19. A method according to claim 11, wherein said template-concatenation step includes the substep of evaluating phrase options for the template sequences according to a given syntax.

20. A method according to claim 19, wherein said template-concatenation step includes the substeps of tracking phrase options corresponding to template sequences having the lowest dissimilarity scores, and selecting the best-matching phrase options as said candidate strings.

* * * * *